(12) United States Patent
Koehler et al.

(10) Patent No.: US 9,721,272 B2
(45) Date of Patent: Aug. 1, 2017

(54) DETERMINING ADVERTISEMENT CHANNEL MIXTURE RATIOS

(75) Inventors: James R. Koehler, Boulder, CO (US); Elizabeth Van Alstine, Mountain View, CA (US)

(73) Assignee: Google Inc., Mountain View, CA (US)

( * ) Notice: Subject to any disclaimer, the term of this patent is extended or adjusted under 35 U.S.C. 154(b) by 984 days.

(21) Appl. No.: 12/556,909

(22) Filed: Sep. 10, 2009

(65) Prior Publication Data

US 2016/0364935 A1 Dec. 15, 2016

(51) Int. Cl.
 *G06Q 30/00* (2012.01)
 *G06Q 30/02* (2012.01)

(52) U.S. Cl.
 CPC ............................. *G06Q 30/0249* (2013.01)

(58) Field of Classification Search
 CPC .................................................. G06Q 30/0249
 USPC ...................... 705/14.41, 14.42, 14.43, 14.48
 See application file for complete search history.

(56) References Cited

U.S. PATENT DOCUMENTS

| | | | |
|---|---|---|---|
| 7,246,083 B2 * | 7/2007 | Bibelnieks et al. | 705/14.43 |
| 7,590,516 B2 * | 9/2009 | Jourdan et al. | 703/10 |
| 7,904,327 B2 * | 3/2011 | Phelan et al. | 705/7.29 |
| 7,949,561 B2 * | 5/2011 | Briggs | 705/14.41 |
| 7,949,562 B2 * | 5/2011 | Collins | 705/14.43 |
| 2003/0229536 A1 * | 12/2003 | House et al. | 705/10 |
| 2007/0033096 A1 | 2/2007 | Jeong | |
| 2010/0057534 A1 * | 3/2010 | Gershkoff | 705/10 |

* cited by examiner

*Primary Examiner* — David Stoltenberg
*Assistant Examiner* — Allan Woodworth, II
(74) *Attorney, Agent, or Firm* — Fish & Richardson P.C.

(57) ABSTRACT

Methods, systems, and apparatus, including computer program products, for determining a mixture ratio for allocating portions of an advertising budget among different advertising channels (e.g., print, online, radio, television) to optimize a performance measure, such as cost-per-action. A mixture space is used to define the available advertising channels and any constraints placed on those channels, such as no more than fifty percent of the advertising budget being allocated to a particular channel, and test mixture ratios are selected according to an optimality criterion. The selected test mixture ratios are used during a testing period on live traffic. The performance measures from the test mixture ratios are used to select a preferred mixture ratio from the mixture space.

21 Claims, 6 Drawing Sheets

DETERMINING ADVERTISEMENT CHANNEL MIXTURE RATIOS

BACKGROUND

This specification relates to advertising.

Advertisers often have multiple advertising channels through which they can conduct an advertising campaign such as through television, radio, print and online media. How an advertiser apportions the adverting budget among the various advertising channels often affects the advertiser's return-on-investment. For example, a higher return-on-investment for an advertised product may be realized when an advertiser spends, respectively, 20%, 40% and 40% of the advertising budget on television, print and online media advertising as compared to spending, respectively, 30%, 20% and 50% of the advertising budget on television, print and online media advertising.

One approach to determining how the advertising budget should be apportioned relies on examining past advertising budget apportionments and the corresponding performance of the advertising campaigns, and using this information to predict how the budget should be apportioned for future campaigns to realize a desired result. However past apportionments and performances may not always be relevant to the advertiser's current advertising strategies. For example, an advertiser may want to employ an advertising channel that the advertiser has not used in the recent past (or at all) and thus no historical information for the channel is available.

Further, as the performance of a campaign is closely coupled to the type of product/service and the advertising channels used, there may not be historical information available for new products/services.

SUMMARY

In general, the subject matter of this specification describes technologies relating to determining mixture ratios for allocating portions of an advertising budget among different advertising channels.

In general, one aspect of the subject matter described in this specification can be implemented in methods that include identifying an advertising mixture space specifying advertising channels defining mediums through which advertising campaigns can be conducted, and specifying constraints on allocations of an advertising budget to corresponding advertising channels; determining a plurality of test advertising mixture ratios from the advertising mixture space, each of the test advertising mixture ratios defining a proportion of the advertising budget to be allocated to each of the advertising channels in accord with the constraint, and the proportions defined by each test advertising mixture ratio comprise the entire advertising budget; determining a performance measure of each of the test advertising mixture ratios from traffic during a testing period; and determining a preferred advertising mixture ratio based on the performance measures of the test advertising mixture ratios. Other embodiments of this aspect include corresponding systems, apparatus, and computer program products.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

In general, the subject matter of this specification relates to determining a mixture ratio for allocating portions of an advertising campaign budget among different advertising channels (e.g., search, display, content, and YouTube in the online medium context) to optimize a performance measure, such as cost-per-action, for the campaign. The mixture ratio specifies the portion of the advertising budget allocated/apportioned to each advertising channel to be used in the advertising campaign. For example, a particular mixture ratio may specify that 30% of the advertising budget is apportioned to advertising channel A, 60% of the advertising budget is apportioned to advertising channel B and 10% of the advertising budget is apportioned to advertising channel C. All of the potential advertising mixture ratios can be represented by an advertising mixture space.

Figure 1:
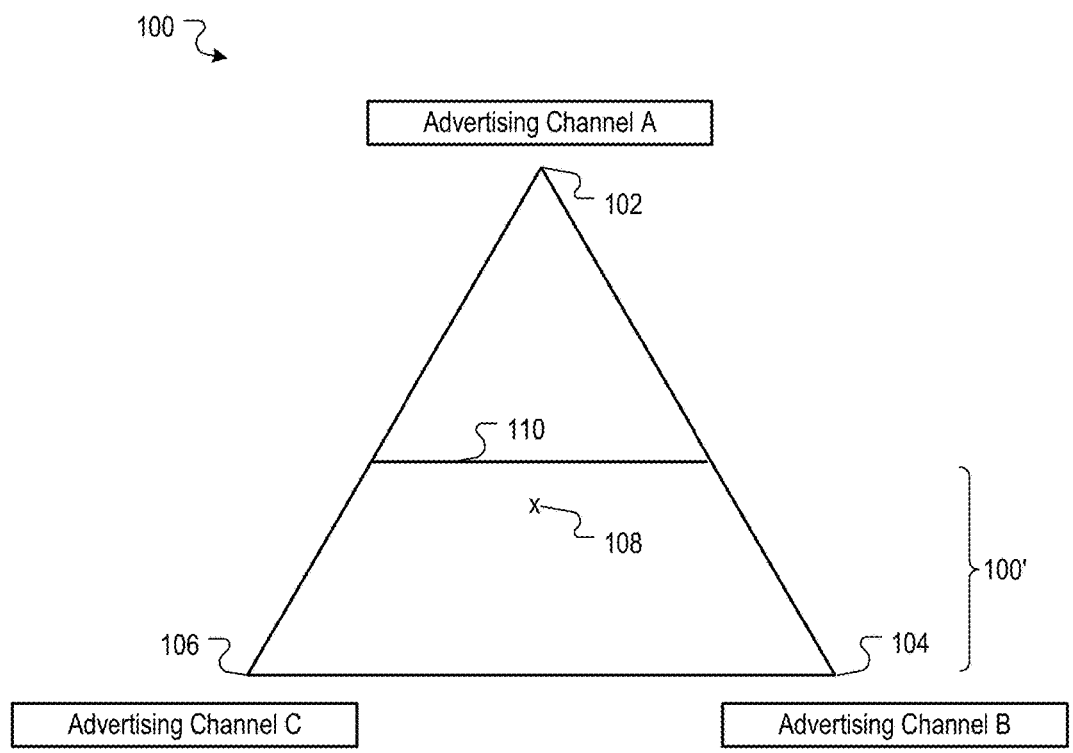
FIG. 1 is an example block diagram of a representation of an advertising mixture space.

FIG. 1 is an example block diagram of a representation of an advertising mixture space 100. An advertising mixture space 100 is a mapping that defines all permissible combinations of allocations of the advertising budget to the advertising channels. For example, three advertising channels are shown in FIG. 1, advertising channels A, B and C. An advertising mixture ratio specifies the advertising channels to which the budget will be allocated and the proportion of the budget allocated to each specified channel. For example, an advertising mixture ratio in advertising mixture space 100 may specify advertising channels A, B and C, and the proportion of the budget allocated to each.

Mixture ratio 102 (i.e., the top vertex) specifies that 100% of the budget is apportioned to advertising channel A, mixture ratio 104 (i.e., the right vertex) specifies that 100% of the budget is apportioned to advertising channel B, and mixture ratio 106 (i.e., the left vertex) specifies that 100% of the budget is apportioned to advertising channel C. Further, mixture ratio 108 (i.e., a point equidistant from all three vertices) specifies that ⅓ of the budget is apportioned to advertising channel A, ⅓ of the budget is apportioned to advertising channel B and ⅓ of the budget is apportioned to advertising channel C.

A constraint 110 can also be represented by the advertising mixture space 100. A constraint defines a less than maximum utilization of an advertising channel, and/or a more than minimum utilization of the advertising channel. For example, an advertiser may specify that no more than X percent of the advertising budget can be allotted to a particular advertising channel (i.e., a constraint). Thus a constraint reduces the number of permissible advertising mixtures ratios in the advertising mixture space 100. For example, constraint 110 indicates that no more than 50% of the advertising budget can be apportioned to advertising channel A. As such, only the advertising mixture ratios mapped to the constrained advertising mixture space 100' are permissible advertising mixtures ratios.

For clarity, advertising mixture space and constrained advertising mixture space will be used interchangeably in this description. In some scenarios, there are constraints on more than one advertising channel, or no constraints at all.

Test advertising mixture ratios are selected from the advertising mixture space 100 according to, for example, an optimality criterion such as D-optimality. The selected test advertising mixture ratios are used to apportion the advertising budget among the advertising channels during a testing period on live traffic. The performance measures from the test mixture ratios are used to select a preferred mixture ratio from the advertising mixture space 100', e.g., the test advertising mixture ratio with the highest performance measure. This preferred advertising mixture ratio can then be used to apportion the advertising budget among the advertising channels that will be used to conduct the advertising campaign.

In other scenarios the advertising mixture space can have more or less advertising channels than shown in FIG. 1. For example, if four advertising channels are to be used then the advertising mixture space can be represented as a tetrahedron. However, for the remainder of this description, a mixture space having three advertising channels will be used as an example.

§1.0 Example Process for Determining a Preferred Advertising Mixture Ratio

Figure 2:
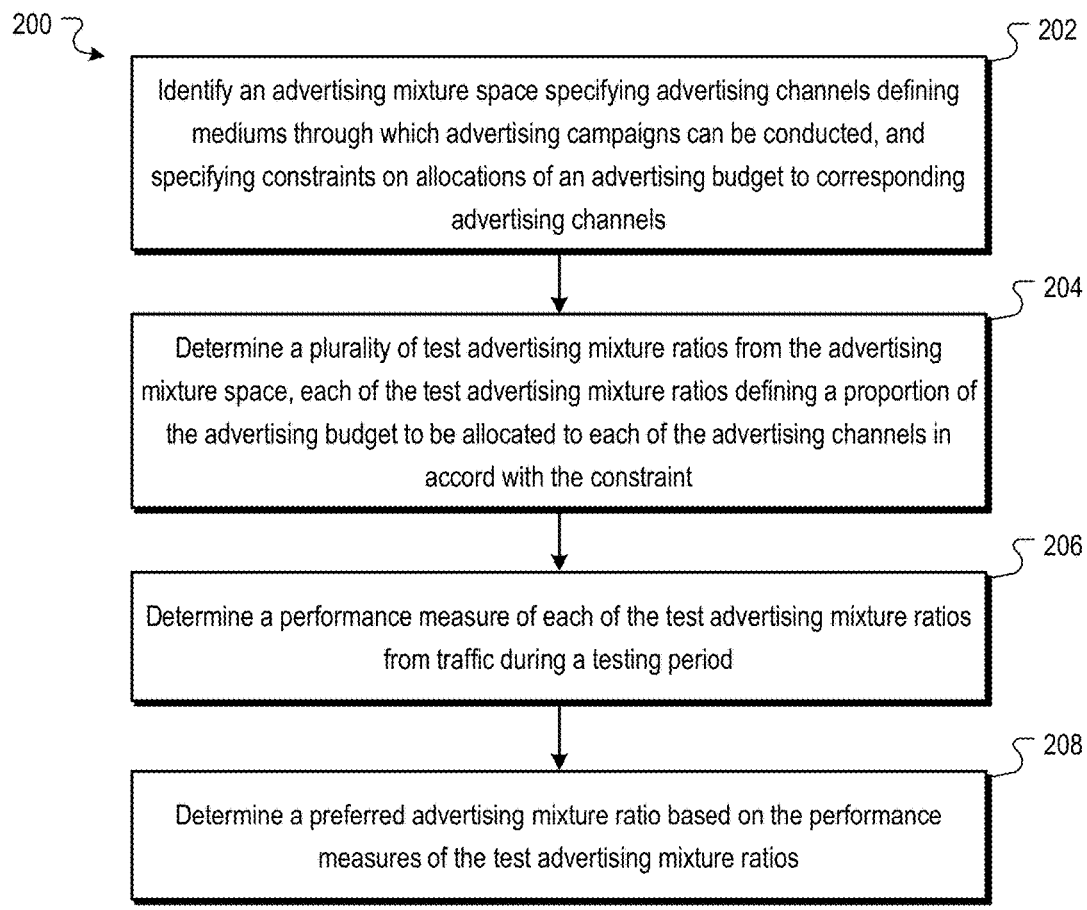
FIG. 2 is a flow diagram of an example process for determining a preferred advertising mixture ratio.

FIG. 2 is a flow diagram of an example process 200 for determining a preferred advertising mixture ratio. The example process 200 can be implemented in a data processing apparatus that includes one or more computer devices, examples of which are described with respect to FIG. 6. Each of steps recited below, for example, are performed by the data processing apparatus.

An advertising mixture space is identified (202). As described above, the advertising mixture space specifies advertising channels, and the channels define mediums through which advertising campaigns can be conducted. The advertising mixture space also specifies constraints on allocations of an advertising budget to corresponding advertising channels if such constraints are present (e.g., some advertisers may not wish to place constraints on the allocation of the budget).

A plurality of test advertising mixture ratios from the advertising mixture space are determined (204). A test advertising mixture ratio is an advertising mixture ratio selected from the advertising mixtures ratios within the advertising mixture space. Each of the test advertising mixture ratios define a proportion of the advertising budget to be allocated to each of the advertising channels, as permitted by the advertising mixture space (e.g., in accord with any constraints). For example, a test advertising mixture ratio can specify that 25% of the budget be allocated to advertising channel A, 35% of the budget be allocated to advertising channel B, and 40% of the budget be allocated to advertising channel C. The proportions defined by each test advertising mixture ratio comprise the entire advertising budget (i.e., the sum of the proportions defined by the test advertising mixture ratio is 100 percent of the advertising budget), and each of the test advertising mixture ratios define a different ratio.

A performance measure of each of the test advertising mixture ratios is determined from traffic during a testing period (206). A performance measure is a quantitative indicator of the performance (e.g., a cost-per-action for a click-through, a conversion, or a web page visit) of an advertising campaign having an advertising budget, or a portion thereof, apportioned according to a test advertising mixture ratio. For convenience, such a performance measure is referred to as a performance of an advertisement mixture ratio. The performance measures are determined in-situ according to actual web traffic.

In some implementations, only activities associated with paid advertising are accounted for in the performance measure. For example, only click-throughs and/or conversions resulting from the placement of an advertisement on a web page and subsequent selection of the advertisement affect the performance measure. However, in other implementations, the performance measures are affected not only by paid advertising but also by organic searches and search result selections (e.g., a user conducts a web search and navigates to a web page based on the results of that web search) and direct navigation (e.g., a user navigates directly to a web page by entering the URL of the web page). These latter two activities can cause web page views/visits without selection of an advertisement (i.e., paid advertising). The magnitude of the performance measures can vary based on whether the performance measures include only paid advertising activities or paid advertising, organic, and direct navigation activities. Thus consideration can be given as to whether only paid advertising or paid advertising, organic, and direct navigation activities are to be included in the performance measures.

In some implementations, an advertising campaign is conducted across multiple marketing segments, with an advertising budget (e.g., a portion of the advertising budget for the entire campaign) allotted to each marketing segment. Each test advertising mixture ratio can be applied to the advertising budget for a marketing segment, and a performance measure can indicate the performance of the advertising campaign in the marketing segment when the advertising budget for that marketing segment is apportioned according to the test advertising mixture ratio. As discussed below with reference to FIG. 5, a test advertising mixture ratio can be applied during multiple different testing periods and/or applied to different marketing segments. The marketing segments can be, for example, demographic marketing segments (DMA), geographic regions or sets of grouped client devices (e.g., personal computers identified by IP addresses or cookies resident on the client devices).

A preferred advertising mixture ratio is determined based on the performance measures of the test advertising mixture ratios (208). In some implementations, the test advertising mixture ratio that maximizes the return-on-investment for the advertising campaign can be the preferred advertising mixture ratio. For example, the test advertising mixture ratio that results in the lowest cost-per-action can be determined (selected) to be the preferred advertising mixture ratio. The preferred advertising ratio can then be used to apportion the advertising budgets for all DMAs (or other divisions of the advertising budget, if divided, or the entire advertising budget for the campaign if not divided).

§2.0 Example Process for Determining Test Advertising Mixture Ratios

Figure 3:
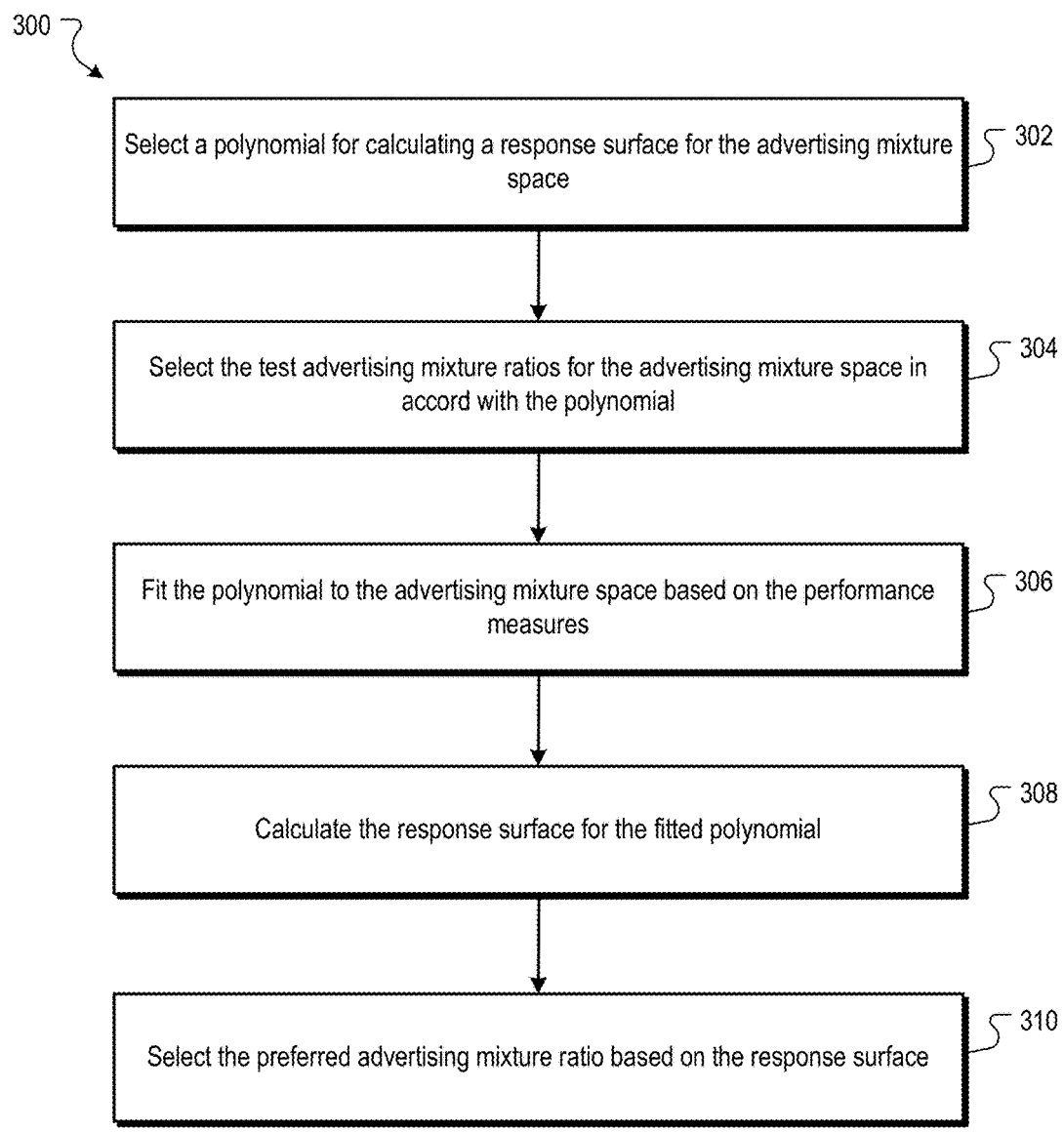
FIG. 3 is a flow diagram of an example process for determining test advertising mixture ratios and selecting a preferred advertising mixture ratio.

FIG. 3 is a flow diagram of an example process 300 for determining test advertising mixture ratios and selecting a preferred advertising mixture ratio. The performance measures of the test advertising mixture ratios can be used to contour the mapping defined by the advertising mixture space. The contour of the mapping represents the expected performance of all advertising mixture ratios within the advertising mixture space based on the known performance measures of the test advertising mixture ratios.

Figure 4A:
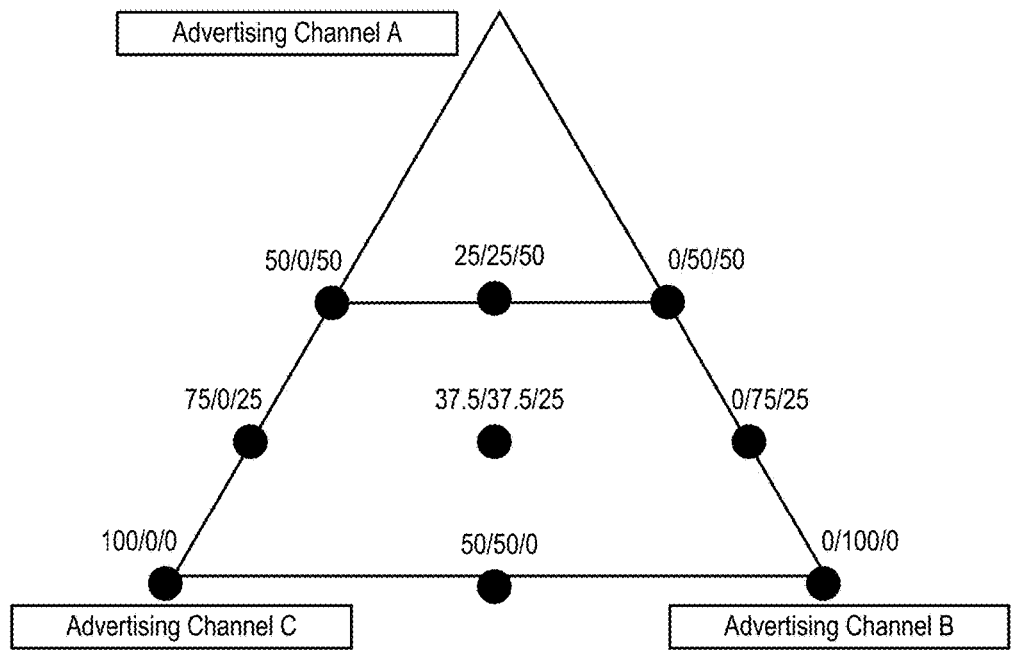
FIGS. 4A-4B are, respectively, diagrams of an example advertising mixture space and determined test advertising mixture ratios, and an example contour of the advertising mixture space derived from the performance measures of the test advertising mixture ratios.
Figure 4B:
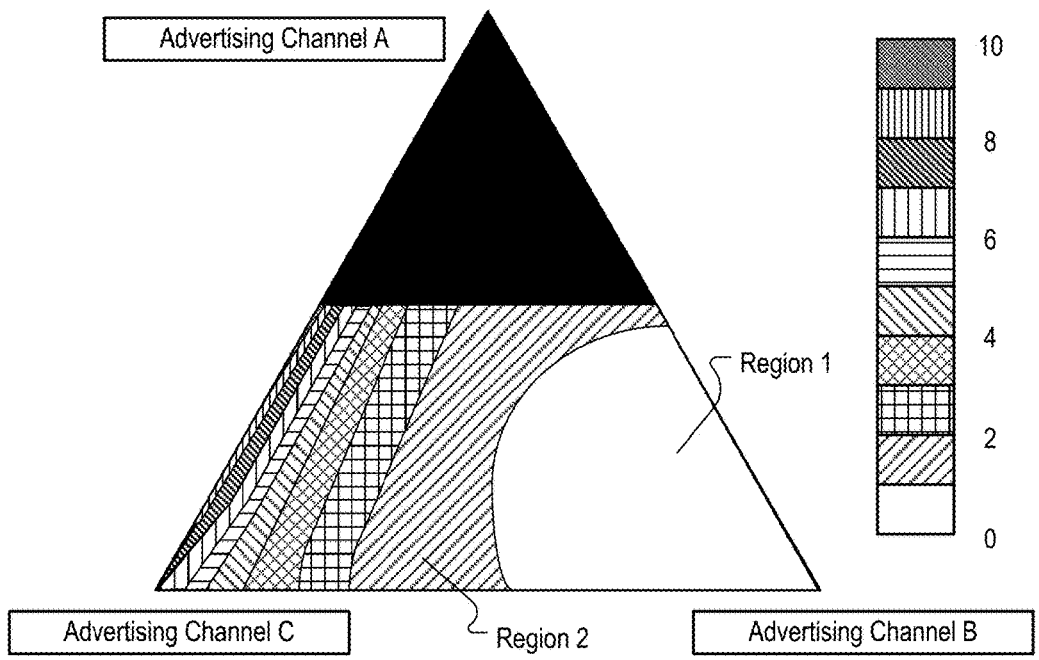

Description of the process 300 can be better understood with reference to FIGS. 4A-4B. FIGS. 4A and 4B are, respectively, diagrams of an example advertising mixture space and determined test advertising mixture ratios, and an example contour of the advertising mixture space derived from the performance measures of the test advertising mixture ratios.

FIG. 4A illustrates nine test advertising mixtures within the advertising mixture space. For example, the test advertising mixture ratio of 50/0/50 specifies that 50% of the advertising budget is apportioned to Advertising Channel C, 0% apportioned to Advertising Channel B, and 50% apportioned to Advertising Channel A; and the test advertising mixture ratio of 0/75/25 specifies that 0% of the advertising budget is apportioned to Advertising Channel C, 75% apportioned to Advertising Channel B, and 25% apportioned to Advertising Channel A.

FIG. 4B illustrates the contour of the advertising mixture space of FIG. 4A based on the performance measures of the nine test advertising mixture ratios of FIG. 4A. The contour represents the values of the expected performance measures of the advertising mixtures ratios within the advertising mixture space, and can be graphically represented as a contour surface or "heat map" of regions. For example, region 1 includes the advertising mixture ratios that are expected to have the lowest cost-per-action values for the advertising campaign, and region 2 includes the advertising mixture ratios that are expected to have the second lowest cost-per-action values.

The preferred advertising mixture ratio can be selected based on the contour of the advertising mixture space. For example, the preferred advertising mixture ratio can be selected from region 1 as region 1 includes the advertising mixture ratios expected to have the lowest cost-per-action.

The process 300 of FIG. 3, for example, is a process by which test advertising mixture ratios can be selected, the performance measures of which can be used to derive the contour of the advertising mixture space.

A polynomial for calculating a response surface for the advertising mixture space is selected (302). The response surface defines the contour of the advertising mixture space. In some implementations, the selected polynomial is a quadratic polynomial. The degree of the polynomial determines in part how the response surface can track changes in the performance measures of the various advertising mixtures ratios across the advertising mixture space. Equation 1, for example, is one polynomial-based model that can be used to calculate the response surface for the advertising mixture space of FIG. 4A:

$$\log_{10}(\text{cost-per-action}) = \beta_a p_a + \beta_b p_b + \beta_c p_c + \beta_{ab} p_a p_b + \beta_{ac} p_a p_c + \beta_{cb} p_c p_b + er \quad \text{(Equation 1)}$$

Where $p_a$, $p_b$ and $p_c$ are the variables corresponding to an advertising mixture ratio utilizing advertising channel A, advertising channel B, advertising channel C, advertising channels A and B, advertising channels A and C, and advertising channels C and B, respectively. $\beta_a$, $\beta_b$, $\beta_c$, $\beta_{ab}$, $\beta_{ac}$ and $\beta_{cb}$ are the coefficients for the variables $p_a$, $p_b$ and $p_c$ the respective products of these variables. Er is an error value. However, other polynomials can also be used, such as cubic polynomial or even higher-order polynomials.

The test advertising mixture ratios for the advertising mixture space are selected in accord with the polynomial (304). The selection of test advertising mixture ratios determines in part the accuracy with which the response surface can be calculated because the known performance measures of the test advertising mixtures ratios are used to interpolate performance measures for advertising mixtures ratios that were not tested on live traffic. Thus it is desirable to select the test advertising mixture ratios that provide the most information for forming/calculating the response surface, as described below.

Although there are many approaches for optimizing the selection of test advertising mixtures ratios to increase the accuracy of the response surface, one approach is to use a greedy exchange algorithm. The first step of this approach is to create a fine (e.g., dense) grid of potential advertising mixture ratios in the advertising mixture space. Second, "n" advertising mixture ratios are selected from the advertising mixture space as the initial set of test advertising mixture ratios, and an optimality metric for this set is computed. In some implementations, the D-optimality metric/criterion is used. However other optimality metrics can also be used such as A- or E-optimality metrics.

After the initial set of test advertising mixture ratios has been determined, each test advertising mixture ratio is sequentially exchanged from the initial set with each advertising mixture ratio that was not in the initial set, and the improvement (or change) in the optimality metric is recorded. Next, a candidate and non-candidate mixture ratio pair that most improves the optimality metric are swapped. This process is iterated until no improvement(s) can be found, or until the improvements are less than a threshold. When no improve can be found, this set of advertising mixture ratios is the set of test advertising mixture ratios. This set of test advertising mixture ratios is applied to the campaign budgets for various marketing segments and tested on live traffic, as described above.

The polynomial is fitted to the advertising mixture space based on the performance measures of the test advertising mixture ratios (306). The coefficients of the polynomial can be adjusted to better track the known performance measures of the test advertising mixture ratios across the advertising mixture space. Thus the fitted polynomial is a function that represents the expected performance measures of advertising mixture ratios across of the advertising mixture space. As such, given an advertising mixture ratio (e.g., a ratio that was not one of the test advertising mixture ratios), the fitted polynomial can be used predict the performance measure of the given advertising mixture ratio.

The response surface for the fitted polynomial is calculated (308). In some implementations linear regression techniques are used to extract parameters for calculation of the response surface (e.g., performance measures for advertising mixture ratios that were not part of the test set). The response surface defines the contour of performance measures across the advertising mixture space. Thus the response surface defines performance measures for all advertising mixture ratios in the advertising mixture space, as illustrated, for example, in FIG. 4B.

The preferred advertising mixture ratio is selected based on the response surface (310). As the response surface defines the performance measures for all of the advertising mixture ratios, the advertising mixture ratio with the optimal performance can be selected as the preferred advertising mixture ratio. For example, if the performance measure is cost-per-action, the advertising mixture ratio that results in the lowest cost-per-action can be selected as the preferred advertising mixture ratio. As described above, this preferred advertising mixture ratio can be used as the advertising mixture ratio for all marketing segments.

Figure 6:
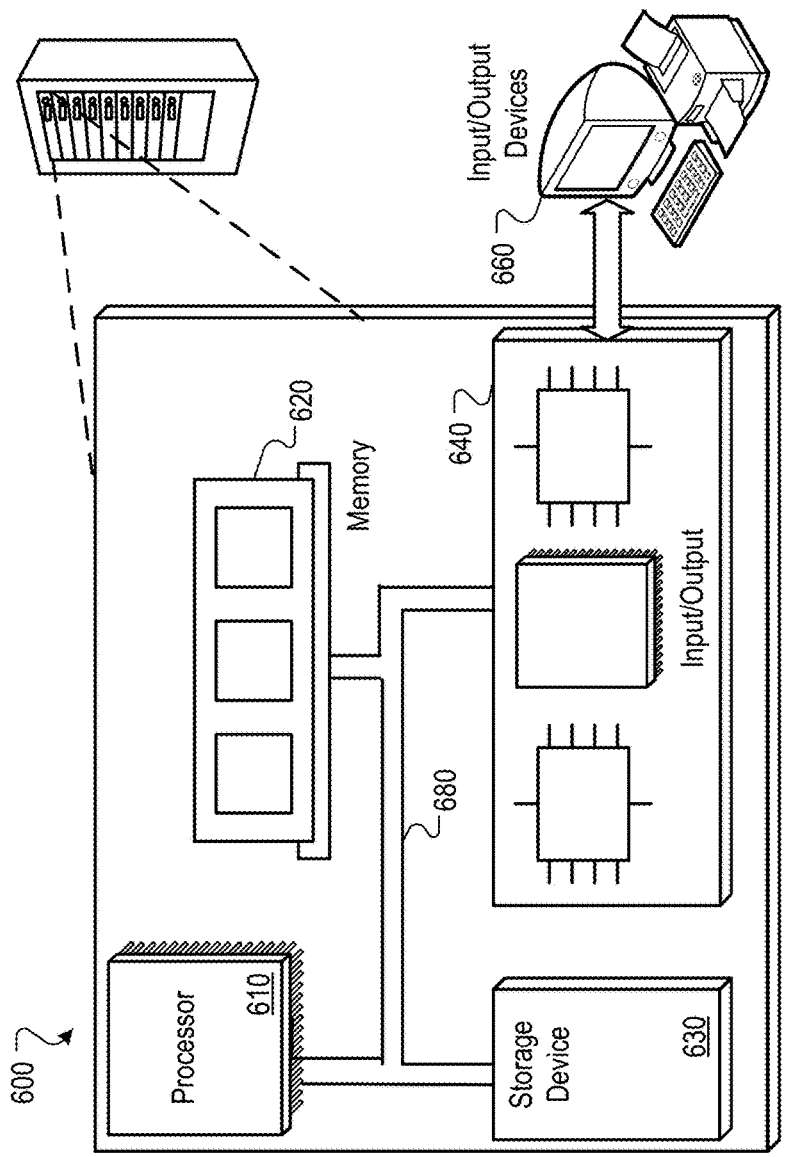
FIG. 6 is an example data processing apparatus.

The example process 300 can be implemented in the data processing apparatus of FIG. 6. Each of steps recited above, for example, are performed by the data processing apparatus.

§3.0 Example Process for Determining Performance Measures

Figure 5:
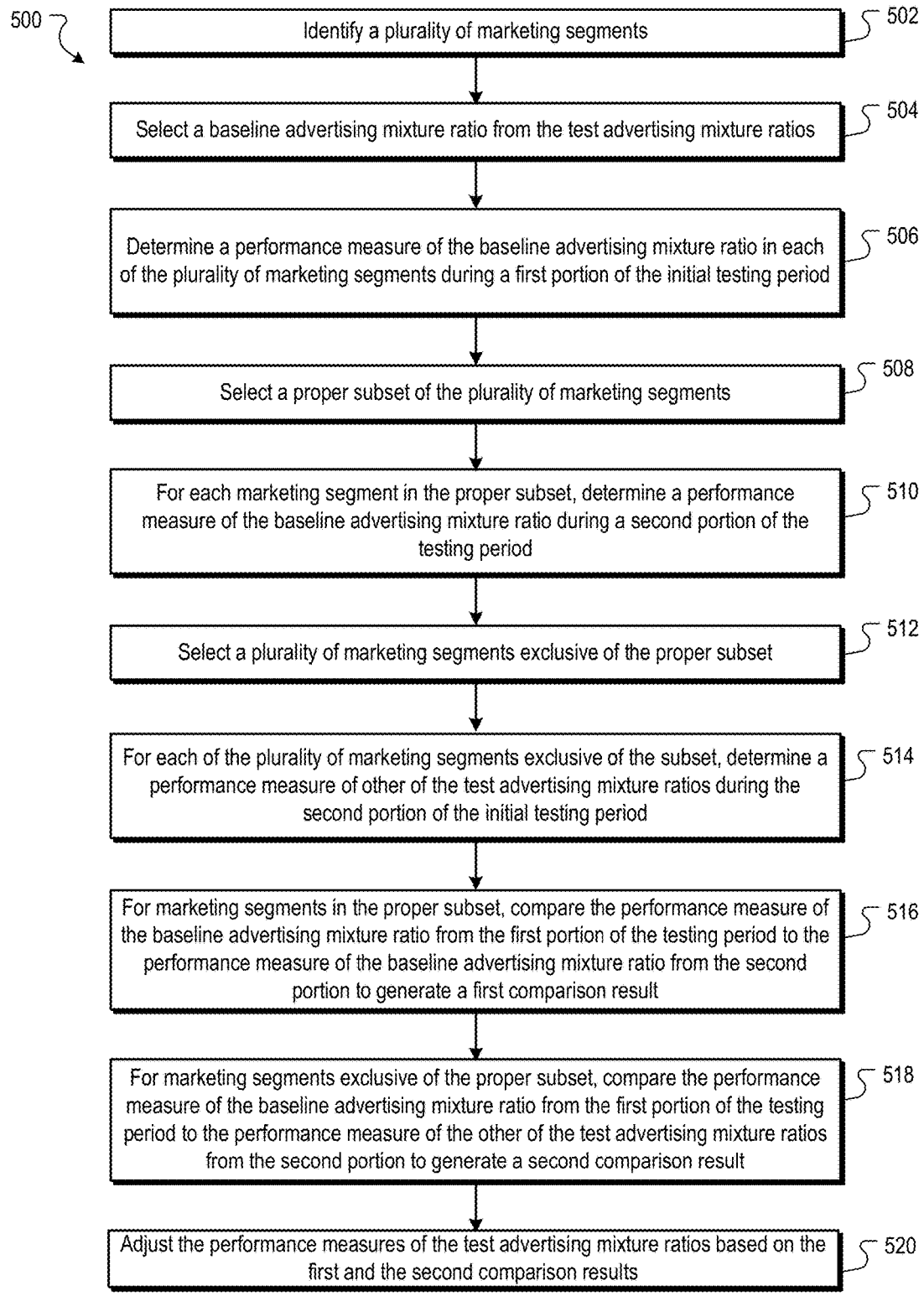
FIG. 5 is a flow diagram of an example process for determining performance measures.

FIG. 5 is a flow diagram of an example process 500 for determining performance measures. The example process 500 can be implemented in the data processing apparatus of FIG. 6. Each of steps recited above, for example, are performed by the data processing apparatus.

A plurality of marketing segments is identified (502). As described above, a market segment can be, for example, a DMA, a geographic region or a group of client devices. The marketing segments can be identified from, for example, geographic or demographic survey information or client device user information (e.g., information supplied by users through a user profile).

A baseline advertising mixture ratio is selected from the test advertising mixture ratios (504). For the set of test advertising mixture ratios, for example, as determined according to method 300, one test advertising mixture ratio is selected (i.e., the baseline advertising mixture ratio).

A performance measure of the baseline advertising mixture ratio in each of the plurality of marketing segments is determined during a first portion of the testing period (506). Thus for all (or a majority) of the marketing segments the baseline advertising mixture ratio is applied to the advertising campaign budgets for the marketing segments during a first portion of a testing period. For example, the testing period can be two weeks long and the first portion can be the first week of the two-week testing period. However, the testing period can be less than or greater than two weeks. In some scenarios, long testing periods may be needed to ensure the performance measures are based on enough data to achieve some specific confidence level in the measures.

A proper subset of the plurality of marketing segments is selected (508). By definition, the proper subset is less than all of the marketing segments. The proper subset is selected to include marketing segments to which the baseline advertising mixture ratio was applied during the first portion of the test period.

For each marketing segment in the proper subset, a performance measure of the baseline advertising mixture ratio during a second portion of the testing period is determined (510). The second portion is different from the first portion of the testing period. For example, in the above scenario of a two-week testing period, with the first week being the first portion of the testing period, the second week can be the second portion of the testing period. Thus the baseline advertising mixture ratio is applied to at least some of the same marketing segments during the first and second portions. For example, if there are market segments 1-5 and the baseline advertising mixture ratio is applied to all five segments during the first portion of the testing period, the baseline advertising mixture ratio will also be applied to at least one of the five markets segments during the second portion of the testing period.

A plurality of marketing segments exclusive of the proper subset is selected (512). Marketing segments that were not included in the proper subset are selected. For example, if the entire set of marketing segments is marketing segments 1-5 and the proper subset includes marketing segments 1 and 4, then the plurality of marketing segments exclusive of the proper subset may include marketing segments 2, 3 and/or 5.

For each of the plurality of marketing segments exclusive of the subset, a performance measure of other of the test advertising mixture ratios is determined during the second portion of the testing period (514). The other of the test advertising mixture ratios are the test advertising mixture ratios other than the baseline advertising mixture ratio(s). Thus test advertising mixture ratios other than the baseline advertising mixture ratio(s) will be applied to the advertising budgets of the marketing segments exclusive of the subset (not in the subset).

As the baseline advertising mixture ratio is applied to the budgets of all (or a majority of) the marketing segments during the first portion of the testing period and some of the same marketing segments during the second portion, and different test advertising mixture ratios are applied to the budgets of marketing segments during the second portion, a difference-in-difference analysis can, for example, be used to determine and/or evaluate the performance measures of all advertising mixture ratios.

Returning to the above example, if there are five marketing segments, 1-5, and test advertising mixture ratios A-D (with test advertising mixture ratio A being the baseline advertising mixture ratio), advertising mixture ratio A can be applied to the budgets of marketing segments 1-5 during the first week of a two-week testing period. During the second week, test advertising mixture ratio A can be applied to the budgets of marketing segments 1 and 2, and test advertising mixture ratios B, C and D can be applied to the budgets of marketing segments 3, 4 and 5, respectively. The differences between the performances measures of test advertising mixture ratio A when applied to marketing segments 1 and 2 during the first and second weeks can be used to evaluate the performance measures of the other test advertising mixture ratios (i.e., B-D) when applied to the other marketing segments (i.e., 3-5) during the second week.

In sum, the difference between the performance measures of test advertising ratio A when applied to marketing segments during the first and second weeks (first difference) can be used to analyze, or compare or adjust, the performance measures of test advertising mixture ratios B-D based on differences between the performance measures of these ratios from their application to marketing segments 3-5 during the second period and the performance measures of test advertising ratio A when applied to marketing segments 3-5 during the first week (second difference). As described above, this is a difference-in-differences type analysis (e.g., difference between the first and second differences). The performance measures can be adjusted based on the results of this analysis. Such an analysis and adjustment are described in method steps 516-520 below.

For each of the marketing segments in the proper subset, the performance measure of the baseline advertising mixture ratio determined during the first portion of the testing period is compared to the performance measure of the baseline advertising mixture ratio determined during the second portion of the testing period to generate a first comparison result (516). The first comparison result is analogous to the first difference described above.

For each of the plurality of marketing segments exclusive of the proper subset, the performance measure of the baseline advertising mixture ratio determined during the first portion of the testing period is compared to the performance measure of the other of the test advertising mixture ratios determined during the second portion of the testing period to generate a second comparison result (518). The second comparison result is analogous to the second difference described above.

The performance measures of the test advertising mixture ratios are adjusted based on the first comparison results and the second comparison results (520). As it is often impractical to apply all test advertising mixture ratios to all marketing segments (each ratio would have to be applied during two testing periods, with each testing period being sufficiently long to allow satisfaction of some confidence threshold), method 500 permits the performance measures of the test advertising mixtures to be compared relative to each other and adjusted to allow the optimum mixture ratio to be determined based on a relatively short testing period.

It may be desirable to update the performance measures over time to ensure that the previously selected preferred advertising mixture ratio is still the optimal ratio. As such a second performance measure of each of the test advertising mixture ratios can be determined during a second testing period after the testing period, and a second preferred advertising mixture ratio can be determined based on the second performance measures in a manner similar to that described in method 500. If the second preferred advertising mixture ratio (updated preferred advertisement ratio) is different from the previously determined preferred advertising mixture, then the second preferred advertising mixture ratio can be used going forward.

§4.0 Example Processing System

FIG. 6 is block diagram of an example data processing apparatus 600 that can be used to determine a preferred advertising mixture ratio. The apparatus 600 can be used to realize a variety of different types of computer devices, or server and computer devices on which the methods of FIGS. 2, 3 and 5 (an other described methods) can be implemented.

The apparatus 600 includes a processor 610, a memory 620, a storage device 630, and an input/output device 640. Each of the components 610, 620, 630, and 640 can, for example, be interconnected using a system bus 680. The processor 610 is capable of processing instructions for execution within the apparatus 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the apparatus 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the apparatus 600. In one implementation, the storage device 630 is a computer-readable medium. In various different implementations, the storage device 630 can, for example, include a hard disk device, an optical disk device, or some other large capacity storage device, and can store advertisements, metadata for advertisements, and/or advertising campaign budget information.

The input/output device 640 provides input/output operations for the apparatus 600. In one implementation, the input/output device 640 can include one or more of a network interface devices, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, etc.

Although an example processing system has been described in FIG. 6, embodiments of the subject matter and the functional operations described in this specification can be implemented in other digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such backend, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   generating, by a data processing apparatus, an advertising mixture space representing a plurality of advertising mixture ratios within a polygon having a plurality of vertices, wherein each vertex represents an allocation of an entire advertising budget to a corresponding online media advertising channel in an electronic data network, and each advertising mixture ratio represents a proportion of the advertising budget to be allocated to each of the advertising channels;
   selecting, by the data processing apparatus, a set of test advertising mixture ratios from the advertising mixture space that provides a threshold amount of information for forming a response surface representing performance measures corresponding to the plurality of advertising mixture ratios in the advertising mixture space, the set of test advertising mixture ratios is a subset of the plurality of advertising mixture ratios, wherein the set of test advertising mixture ratios is optimized by applying a greedy exchange algorithm to the plurality of advertising mixture ratios and calculating a D-optimality metric;

monitoring live web traffic over the electronic data network during a first testing period;

determining, by the data processing apparatus, a first performance measure of each of the test advertising mixture ratios from the monitored live web traffic during the first testing period, using a difference-in-difference analysis;

generating the response surface, wherein the response surface defines contours of the advertising mixture space, wherein the contours represent a performance of the plurality of advertising mixture ratios within the advertising mixture space, including determined first performance measures of the test advertising mixture ratios and predicted performances of advertising mixture ratios that were not tested on traffic during the testing period, wherein the optimized set of test advertising mixture ratios facilitate generating a response surface having contours with increased accuracy;

determining, by the data processing apparatus, a preferred advertising mixture ratio based on the contours of the response surface, the preferred advertising mixture ratio having a greater performance than any other advertising mixture ratio in the advertising mixture space;

updating the preferred advertising mixture ratio based on monitoring additional live web traffic over the electronic data network during a second testing period, wherein the updating comprises:
  selecting a proper subset of online media advertising channels in the electronic data network;
  from the additional live web traffic monitored during the second testing period, determining, by the data processing apparatus, a second performance measure of each of a plurality of test advertising mixture ratios for the proper subset based on a difference-in-difference analysis;
  updating the contours of the response surface based on second performance measures of the plurality of test advertising mixture ratios for the proper subset;
  determining, by the data processing apparatus, an updated preferred advertising mixture ratio based on the updated contours of the response surface; and
in response to determining the updated preferred advertising mixture ratio, allocating, by the data processing apparatus, a proportion of the advertising budget to each advertising channel, the allocation being based on the updated preferred advertising mixture ratio, whereby the allocation by the data processing apparatus causes advertisements to be distributed through the electronic data network using a minimum amount of data resources for producing the greater performance of the updated preferred advertising mixture ratio as compared to any other allocation available in the advertising mixture space.

2. A computer-implemented method, comprising:
generating, by a data processing apparatus, an advertising mixture space representing a plurality of advertising mixture ratios within a polygon having a plurality of vertices, wherein each vertex represents an allocation of an entire advertising budget to a corresponding online media advertising channel in an electronic data network, and each advertising mixture ratio represents a proportion of the advertising budget to be allocated to each of the advertising channels;

selecting, by the data processing apparatus, a plurality of test advertising mixture ratios from the advertising mixture space the proportions defined by each test advertising mixture ratios comprise the entire advertising budget, wherein selecting the plurality of test advertising mixture ratios from the advertising mixture space comprises selecting a polynomial for calculating a response surface for the advertising mixture space and selecting the test advertising mixture ratios for the advertising mixture space in accord with the polynomial, the plurality of test advertising mixture ratios is a subset of the plurality of advertising mixture ratios;

monitoring live web traffic over the electronic data network during a first testing period;

determining, by the data processing apparatus, a first performance measure of each of the test advertising mixture ratios from the monitored live web traffic during the first testing period, wherein determining a performance measure of each of the test advertising mixture ratios comprises identifying a plurality of marketing segments, selecting a baseline advertising mixture ratio from the test advertising mixture ratios, determining a performance measure of the baseline advertising mixture ratio in each of the plurality of marketing segments during a first portion of the testing period, selecting a proper subset of the plurality of marketing segments, for each marketing segment in the proper subset, determining a performance measure of the baseline advertising mixture ratio during a second portion of the testing period different from the first portion, selecting a plurality of marketing segments exclusive of the proper subset, and for each of the plurality of marketing segments exclusive of the subset, determining a performance measure of other of the test advertising mixture ratios during the second portion of the testing period;

generating the response surface, wherein the response surface defines contours of the advertising mixture space, wherein the contours represent a performance of the plurality of advertising mixture ratios within the advertising mixture space, including the determined performance measures of the test advertising mixture ratios and predicted performances of advertising mixture ratios that were not tested on traffic during the testing period; and determining, by the data processing apparatus, a preferred advertising mixture ratio based on the contours of the response surface, the preferred advertising mixture ratio having a greater performance than any other advertising mixture ratio in the advertising mixture space, whereby the preferred advertising mixture ratio determined by the data processing apparatus causes advertisements to be distributed through the electronic data network using the least amount of data resources compared to any other allocation available in the advertising mixture space;

wherein the response surface for the advertising mixture space is calculated in accordance with the following polynomial:

$$\log_{10}(\text{cost-per-action}) = \beta_a p_a + \beta_b p_b + \beta_c p_c + \beta_{ab} p_a p_b + \beta_{ac} p_a p_c + \beta_{cb} p_c p_b + er$$

and wherein $p_a$, $p_b$ and $p_c$ are variables corresponding to an advertising mixture ratio utilizing advertising channel A, advertising channel B, advertising channel C, advertising channels A and B, advertising channels A and C, and advertising channels C and B, respectively of the online media advertising channels, and wherein $\beta_a$, $\beta_b$, $\beta_c$, $\beta_{ab}$, $\beta_{ac}$ and $\beta_{cb}$ are coefficients for the variables $p_a$, $p_b$, and $p_c$ the respective products of these variables, and er is an error value.

3. The method of claim 2, wherein determining the preferred advertising mixture ratio further comprises:
for each of the marketing segments in the proper subset, comparing the performance measure of the baseline advertising mixture ratio determined during the first portion of the testing period to the performance measure of the baseline advertising mixture ratio determined during the second portion of the testing period to generate a first comparison result;
for each of the plurality of marketing segments exclusive of the proper subset, comparing the performance measure of the baseline advertising mixture ratio determined during the first portion of the testing period to the performance measure of the other of the test advertising mixture ratios determined during the second portion of the testing period to generate a second comparison result; and
adjusting the performance measures of the test advertising mixture ratios based on the first comparison results and the second comparison results.

4. The method of claim 2, wherein identifying a plurality of marketing segments comprises identifying a plurality of demographic marketing areas.

5. The method of claim 2, wherein identifying a plurality of marketing segments comprises identifying a plurality of grouped client devices.

6. The method of claim 2, wherein the advertising mixture space includes a mapping that defines all permissible combinations of allocations of the advertising budget to the advertising channels based on one or more constraints.

7. The method of claim 2, further comprising:
determining a second performance measure of each of the test advertising mixture ratios from traffic during a second testing period after the testing period, the traffic received by the data processing apparatus during the second testing period including click-through data, conversion data, and web page visit data that is generated and transmitted by a plurality of grouped client devices to the data processing apparatus for further analysis; and
determining an updated preferred advertising mixture ratio based on the second performance measures of the test advertising mixture ratios.

8. The method of claim 2, wherein the advertising mixture space includes at least one constraint that defines a less than maximum utilization of an advertising channel.

9. One or more computer readable media storing instructions executable by a data processing apparatus, and upon such execution cause the data processing apparatus to perform operations comprising:
generating an advertising mixture space representing a plurality of advertising mixture ratios within a polygon having a plurality of vertices, wherein each vertex represents an allocation of an entire advertising budget to a corresponding online media advertising channel in an electronic data network, and each advertising mixture ratio represents a proportion of the advertising budget to be allocated to each of the advertising channels;
selecting a set of test advertising mixture ratios from the advertising mixture space that provides a threshold amount of information for forming a response surface, the response surface being a surface representing performance measures corresponding to the plurality of advertising mixture ratios in the advertising mixture space, the set of test advertising mixture ratios is a subset of the plurality of advertising mixture ratios, wherein the set of test advertising mixture ratios is optimized by applying a greedy exchange algorithm to the plurality of advertising mixture ratios and calculating a D-optimality metric;
monitoring live web traffic over the electronic data network during a first testing period;
determining, by the data processing apparatus, a first performance measure of each of the test advertising mixture ratios from the monitored live web traffic during the first testing period, using a difference-in-difference analysis;
generating the response surface, wherein the response surface defines contours of the advertising mixture space, wherein the contours represent a performance of the plurality of advertising mixture ratios within the advertising mixture space, including determined first performance measures of the test advertising mixture ratios and predicted performances of advertising mixture ratios that were not tested on traffic during the testing period, wherein the optimized set of test advertising mixture ratios facilitate generating a response surface having contours with increased accuracy;
determining a preferred advertising mixture ratio based on the contours of the response surface, the preferred advertising mixture ratio having a greater performance than any other advertising mixture ratio in the advertising mixture space;
updating the preferred advertising mixture ratio based on monitoring additional live web traffic over the electronic data network during a second testing period, wherein the updating comprises:
selecting a proper subset of online media advertising channels in the electronic data network;
from the additional live web traffic monitored during the second testing period, determining, by the data processing apparatus, a second performance measure of each of a plurality of test advertising mixture ratios for the proper subset based on a difference-in-difference analysis;
updating the contours of the response surface based on second performance measures of the plurality of test advertising mixture ratios for the proper subset;
determining, by the data processing apparatus, an updated preferred advertising mixture ratio based on the updated contours of the response surface; and
in response to determining the updated preferred advertising mixture ratio, allocating, by the data processing apparatus, a proportion of the advertising budget to each advertising channel, the allocation being based on the updated preferred advertising mixture ratio, whereby the allocation by the data processing apparatus causes advertisements to be distributed through the electronic data network using a minimum amount of data resources for producing the greater performance of the updated preferred advertising mixture ratio as compared to any other allocation available in the advertising mixture space.

10. One or more computer readable media storing instructions executable by a data processing apparatus, and upon such execution cause the data processing apparatus to perform operations comprising:

generating an advertising mixture space representing a plurality of advertising mixture ratios within a polygon having a plurality of vertices, wherein each vertex represents an allocation of an entire advertising budget to a corresponding online media advertising channel in an electronic data network, and each advertising mixture ratio represents a proportion of the advertising budget to be allocated to each of the advertising channels;

selecting a plurality of test advertising mixture ratios from the advertising mixture space, including selecting a polynomial for calculating a response surface for the advertising mixture space and selecting the test advertising mixture ratios for the advertising mixture space in accord with the polynomial, the plurality of test advertising mixture ratios is a subset of the plurality of advertising mixture ratios;

monitoring live web traffic over the electronic data network during a testing period;

determining a performance measure of each of the test advertising mixture ratios from the monitored live web traffic during the testing period, wherein determining a performance measure of each of the test advertising mixture ratios comprises identifying a plurality of marketing segments, selecting a baseline advertising mixture ratio from the test advertising mixture ratios, determining a performance measure of the baseline advertising mixture ratio in each of the plurality of marketing segments during a first portion of the testing period, selecting a proper subset of the plurality of marketing segments, for each marketing segment in the proper subset, determining a performance measure of the baseline advertising mixture ratio during a second portion of the testing period different from the first portion, selecting a plurality of marketing segments exclusive of the proper subset, and for each of the plurality of marketing segments exclusive of the subset, determining a performance measure of other of the test advertising mixture ratios during the second portion of the testing period;

generating the response surface, wherein the response surface defines contours of the advertising mixture space, wherein the contours represent a performance of the plurality of advertising mixture ratios within the advertising mixture space, including the determined performance measures of the test advertising mixture ratios and predicted performances of advertising mixture ratios that were not tested on traffic during the testing period; and determining a preferred advertising mixture ratio based on the contours of the response surface, the preferred advertising mixture ratio having a greater performance than any other advertising mixture ratio in the advertising mixture space, whereby the preferred advertising mixture ratio causes advertisements to be distributed through the electronic data network using the least amount of data resources compared to any other allocation available in the advertising mixture space, wherein the response surface for the advertising mixture space is calculated in accordance with the following polynomial:

$$\log_{10}(\text{cost-per-action}) = \beta_a p_a + \beta_b p_b + \beta_c p_c + \beta_{ab} p_a p_b + \beta_{ac} p_a p_c + \beta_{cb} p_c p_b + er$$

11. The one or more computer readable media of claim 10, wherein determining the preferred advertising mixture ratio further comprises:

for each of the marketing segments in the proper subset, comparing the performance measure of the baseline advertising mixture ratio determined during the first portion of the testing period to the performance measure of the baseline advertising mixture ratio determined during the second portion of the testing period to generate a first comparison result;

for each of the plurality of marketing segments exclusive of the proper subset, comparing the performance measure of the baseline advertising mixture ratio determined during the first portion of the testing period to the performance measure of the other of the test advertising mixture ratios determined during the second portion of the testing period to generate a second comparison result; and adjusting the performance measures of the test advertising mixture ratios based on the first comparison results and the second comparison results.

12. The one or more computer readable media of claim 10, wherein identifying a plurality of marketing segments comprises identifying a plurality of demographic marketing areas.

13. The one or more computer readable media of claim 10, wherein identifying a plurality of marketing segments comprises identifying a plurality of grouped client devices.

14. The one or more computer readable media of claim 10, wherein the advertising mixture space includes a mapping that defines all permissible combinations of allocations of the advertising budget to the advertising channels based on one or more constraints.

15. The one or more computer readable media of claim 10, wherein the advertising mixture space includes at least one constraint that defines a less than maximum utilization of an advertising channel.

16. A system, comprising:

a data store configured to store advertising budget data;

one or more computer processors in data communication with the data store and configured to:

generate an advertising mixture space representing a plurality of advertising mixtures ratios within a polygon having a plurality of vertices, wherein each vertex represents an allocation of an entire advertising budget to a corresponding online media advertising channel in an electronic data network, and each advertising mixture ratio represents a proportion of the advertising budget to be allocated to each of the advertising channels;

select a set of test advertising mixture ratios from the advertisement mixture space that provides a threshold amount of information for forming a response surface, the response surface being a surface representing performance measures corresponding to the plurality of advertising mixture ratios in the advertising mixture space, the set of test advertising mixture ratios is a subset of the plurality of advertising mixture ratios, wherein the set of test advertising mixture ratios is optimized by applying a greedy exchange algorithm to the plurality of advertising mixture ratios and calculating a D-optimality metric;

monitor live web traffic over the electronic data network during a first testing period;

determine a first performance measure of each of the test advertising mixture ratios from the monitored live web traffic during the first testing period, using a difference-in-difference analysis;

generate the response surface, wherein the response surface defines contours of the advertising mixture space, wherein the contours represent a performance of the plurality of advertising mixture ratios within the advertising mixture space, including the determined performance measures of the test advertising mixture ratios and predicted performances of advertising mixture ratios that were not tested on traffic during the testing period, wherein the optimized set of test advertising mixture ratios facilitate generating a response surface having contours with increased accuracy;

determine a preferred advertising mixture ratio based on the contours of the response surface, the preferred advertising mixture ratio having a greater performance than any other advertising mixture ratio in the advertising mixture space;

update the preferred advertising mixture ratio based on monitoring additional live web traffic over the electronic data network during a second testing period, wherein the updating comprises:

selecting a proper subset of online media advertising channels in the electronic data network;

from the additional live web traffic monitored during the second testing period, determining, by the data processing apparatus, a second performance measure of each of a plurality of test advertising mixture ratios for the proper subset based on a difference-in-difference analysis;

updating the contours of the response surface based on second performance measures of the plurality of test advertising mixture ratios for the proper subset;

determining, by the data processing apparatus, an updated preferred advertising mixture ratio based on the updated contours of the response surface; and allocate a proportion of the advertising budget to each advertising channel, in response to determining the updated preferred advertising mixture ratio based on the performance measures of the test advertising mixture ratios, whereby the allocation causes advertisements to be distributed through the electronic data network using a minimum amount of data resources for producing the greater performance of the updated preferred advertising mixture ratio as compared to any other allocation available in the advertising mixture space.

17. A system comprising one or more computer processors in data communication with a data store and configured to:

generate an advertising mixture space representing a plurality of advertising mixture ratios within a polygon having a plurality of vertices, wherein each vertex represents an allocation of an entire advertising budget to a corresponding online media advertising channel in an electronic data network, and each advertising mixture ratio represents a proportion of the advertising budget to be allocated to each of the advertising channels;

select a plurality of test advertising mixture ratios from the advertising mixture space including selecting a polynomial for calculating a response surface for the advertising mixture space and selecting the test advertising mixture ratios for the advertising mixture space in accord with the polynomial, the plurality of test advertising mixture ratios is a subset of the plurality of advertising mixture ratios;

monitor live web traffic over the electronic data network during a testing period;

determine a performance measure of each of the test advertising mixture ratios from the monitored live web traffic during the testing period, wherein the performance measure of each of the test advertising mixture ratios is determined by performing operations comprising identifying a plurality of marketing segments, selecting a baseline advertising mixture ratio from the test advertising mixture ratios, determining a performance measure of the baseline advertising mixture ratio in each of the plurality of marketing segments during a first portion of the testing period, selecting a proper subset of the plurality of marketing segments, for each marketing segment in the proper subset, determining a performance measure of the baseline advertising mixture ratio during a second portion of the testing period different from the first portion, selecting a plurality of marketing segments exclusive of the proper subset, and for each of the plurality of marketing segments exclusive of the subset, determining a performance measure of other of the test advertising mixture ratios during the second portion of the testing period;

generate the response surface, wherein the response surface defines contours of the advertising mixture space, wherein the contours represent a performance of the plurality of advertising mixture ratios within the advertising mixture space, including the determined performance measures of the test advertising mixture ratios and predicted performances of advertising mixture ratios that were not tested on traffic during the testing period; and determine a preferred advertising mixture ratio based on the contours of the response surface, the preferred advertising mixture ratio having a greater performance than any other advertising mixture ratio in the advertising mixture space, whereby the preferred advertising mixture ratio causes advertisements to be distributed through the electronic data network using the least amount of data resources compared to any other allocation available in the advertising mixture space, wherein the response surface for the advertising mixture space is calculated in accordance with the following polynomial:

$$\log_{10}(\text{cost-per-action}) = \beta_a p_a + \beta_b p_b + \beta_c p_c + \beta_{ab} p_a p_b + \beta_{ac} p_a p_c + \beta_{cb} p_c p_b + er$$

18. The system of claim 16, wherein the advertising mixture space includes at least one constraint that defines a less than maximum utilization of an advertising channel.

19. The method of claim 1, wherein selecting, as the plurality of test advertising mixture ratios, a set of advertising mixture ratios, from the advertisement mixture space, that provides a threshold amount of information for forming a response surface further comprises:

determining a candidate set of test advertising mixture ratios;

determining a non-candidate set of test advertising mixture ratios wherein every test advertising mixture ratio in the non-candidate set of test advertising mixture ratios is not in the candidate set of test advertising mixture ratios;

determining that an improvement in the accuracy of the response surface exceeds the threshold when a first test advertising mixture ratio from the non-candidate set is used in place of a second test advertising mixture ratio from the candidate set; and replacing the second test advertising mixture ratio from the candidate set with the first test advertising mixture ratio from the non-candidate set in response to determining that the improvement exceeds the threshold, wherein the first test advertising mixture ratio represents the updated preferred advertising mixture ratio.

20. The computer readable media of claim 9, wherein selecting, as the plurality of test advertising mixture ratios, a set of advertising mixture ratios, from the advertisement mixture space, that provides a threshold amount of information for forming a response surface further comprises:

determining a candidate set of test advertising mixture ratios;

determining a non-candidate set of test advertising mixture ratios wherein every test advertising mixture ratio in the non-candidate set of test advertising mixture ratios is not in the candidate set of test advertising mixture ratios;

determining that an improvement in the accuracy of the response surface exceeds the threshold when a first test advertising mixture ratio from the non-candidate set is used in place of a second test advertising mixture ratio from the candidate set; and replacing the second test advertising mixture ratio from the candidate set with the first test advertising mixture ratio from the non-candidate set in response to determining that the improvement exceeds the threshold, wherein the first test advertising mixture ratio represents the updated preferred advertising mixture ratio.

21. The system of claim 16, wherein the one or more processors are further configured to:

determine a candidate set of test advertising mixture ratios;

determine a non-candidate set of test advertising mixture ratios wherein every advertising mixture ratio in the non-candidate set of test advertising mixture ratios is not in the candidate set of test advertising mixture ratios;

determine that an improvement in the accuracy of the response surface exceeds the threshold when a first test advertising mixture ratio from the non-candidate set is used in place of a second test advertising mixture ratio from the candidate set; and replace the second test advertising mixture ratio from the candidate set with the first test advertising mixture ratio from the non-candidate set in response to determining that the improvement exceeds the threshold, wherein the first test advertising mixture ratio represents the updated preferred advertising mixture ratio.

* * * * *